(12) United States Patent
Nanda

(10) Patent No.: US 8,818,966 B1
(45) Date of Patent: Aug. 26, 2014

(54) CONTINUOUS FILE DEFRAGMENTATION DURING FILE OVER-WRITES

(75) Inventor: Kumari Bijayalaxmi Nanda, Iselin, NJ (US)

(73) Assignee: EMC Corporation, Hopkinton, MA (US)

(*) Notice: Subject to any disclaimer, the term of this patent is extended or adjusted under 35 U.S.C. 154(b) by 695 days.

(21) Appl. No.: 12/982,724

(22) Filed: Dec. 30, 2010

(51) Int. Cl.
*G06F 7/00* (2006.01)
*G06F 17/00* (2006.01)

(52) U.S. Cl.
USPC ........... 707/693; 707/661; 707/822; 711/103; 711/117; 711/170

(58) Field of Classification Search
None
See application file for complete search history.

(56) References Cited

U.S. PATENT DOCUMENTS

| | | | |
|---|---|---|---|
| 5,819,292 A | 10/1998 | Hitz et al. | |
| 5,987,479 A * | 11/1999 | Oliver | 1/1 |
| 6,205,529 B1 | 3/2001 | Shagam | |
| 6,282,041 B1 | 8/2001 | Blumenau | |
| 6,317,815 B1 | 11/2001 | Mayer et al. | |
| 7,076,509 B1 | 7/2006 | Chen et al. | |
| 7,457,982 B2 | 11/2008 | Rajan | |
| 7,631,155 B1 | 12/2009 | Bono et al. | |
| 7,756,831 B1 | 7/2010 | Rao | |
| 7,865,485 B2 | 1/2011 | Mullick et al. | |
| 7,877,554 B2 * | 1/2011 | Bonwick et al. | 711/154 |
| 7,899,989 B2 * | 3/2011 | Moore et al. | 711/117 |
| 7,925,858 B2 | 4/2011 | Rao et al. | |
| 7,945,726 B2 | 5/2011 | Faibish et al. | |
| 7,975,109 B2 * | 7/2011 | McWilliams et al. | 711/147 |
| 2008/0077762 A1 * | 3/2008 | Scott et al. | 711/170 |
| 2008/0307192 A1 * | 12/2008 | Sinclair et al. | 711/218 |
| 2011/0107052 A1 * | 5/2011 | Narayanasamy | 711/171 |

OTHER PUBLICATIONS

Vahalia, Uresh, Unix Internals: The New Frontiers, 1996, p. 261-290, 338-371, Prentice-Hall, Inc., Upper Saddle River, NJ.

Trautman, Philip, and Mostek, Jim, "Scalability and Performance in Modern File Systems," May 6, 2005, 18 pages, Silicon Graphics, Mountain View, CA.

Florido, Juan I. Santos, "Journal File Systems," Linux Gazette, Jul. 2000, Issue 55, 11 pages, Seattle, WA.

Sikand, S., and March, R., "Highly Scalable High Performance Perforce Server Environments," Perforce User Conference, May 2003, Las Vegas, NV, 12 pages.

(Continued)

*Primary Examiner* — Dung K Chau
(74) *Attorney, Agent, or Firm* — Richard Auchterlonie; Novak Druce Connolly Bove + Quigg LLP

(57) ABSTRACT

When a file system manager responds to a request to write data to a specified number of blocks of a file, the file system manager determines that corresponding file system data block allocations exist and determines that the file is fragmented over the corresponding file system data block allocations. In response to determining that the file is fragmented over the corresponding file system data block allocations, the file system manager allocates and substitutes a single extent of contiguous file system data blocks for the corresponding file system data block allocations, and writes data to the newly allocated contiguous file system data blocks. For example, the file system manager compares a spread and a count of extent fragments of the file system data block allocations to appropriate thresholds to trigger the defragmentation upon file over-write.

20 Claims, 7 Drawing Sheets

(56) References Cited

OTHER PUBLICATIONS

Ousterhout et al., "Beating the I/O Bottleneck: A Case for Log-Structured File Systems," Operating Systems Review, vol. 23, No. 1, Jan. 1989, pp. 11-28, ACM Press, Association for Computing Machinery, New York, NY.

Douglis et al., "Log Structured File Systems," COMPCON 89 Proceedings, Feb. 27-Mar. 3, 1989, pp. 124-129, IEEE Computer Society, IEEE, New York, NY.

Rosenblum et al., "The Design and Implementation of a Log-Structured File System," ACM Transactions on Computer Systems, vol. 10, No. 1, Feb. 1992, pp. 26-52, Association for Computing Machinery, New York, NY.

\* cited by examiner

CONTINUOUS FILE DEFRAGMENTATION DURING FILE OVER-WRITES

FIELD OF THE INVENTION

The present invention relates to defragmentation of files in a digital computer system.

BACKGROUND OF THE INVENTION

A file is a kind of dynamically-allocated data structure that an application program can access by name. The application program reads or writes to the file by sending a read or write request to an operating system program called a file system manager. The read or write request specifies the file, an offset in a logical extent of the file, and a number of blocks of data to be read or written, beginning at the specified offset. The typical size of one block of data is four kilobytes or eight kilobytes.

The file system manager maintains the file in a collection of files called a file system. The file system is built upon a logical volume of file system blocks. To an application program, the file system appears to be a tree of directories, subdirectories, and files. The file system manager maintains additional data structures in the file system, such as a map of the file system blocks that are free and the file system blocks that have been allocated to files in the file system.

Popular file systems permit any free block of the file system to be allocated to a file of the file system and mapped to any logical block of the logical extent of the file. The additional flexibility of file system block allocation permits more efficient storage utilization by reducing storage fragmentation and permitting sparse files and efficient dynamic extension of files.

For example, one very popular file system is known as the UNIX-based file system. The UNIX-based file system is described in Uresh Vahalia, Unix Internals—The New Frontiers, Chapter 9, File System Implementations, pp. 261-290, Prentice-Hall, Inc., Upper Saddle River, N.J. (1996). The file in the UNIX-based file system is a hierarchy of file system blocks. The file system block at the top or root of the hierarchy is called an "inode." The inode contains attributes of the file and also a block pointer array including pointers to one or more file system blocks that are directly below the inode in the hierarchy. The data of the file is contained in one or more file system data blocks at the bottom or leaves of the hierarchy. If the file contains more than ten data blocks, then there will be at least one indirect block directly below inode in the hierarchy. Each indirect block includes a block pointer array of up to 256 block pointers.

The popular file systems that permit flexible block mapping in the files suffer a file fragmentation problem when large files are accessed randomly over time. File fragmentation is most noticeable as a gradual decrease in read performance. A file is fragmented when the logical extent of the file is not mapped to a single extent of contiguous file system blocks in the logical volume of the file system. If the logical extent of a file becomes mapped to a large number of relatively small extents that are widely distributed over the logical volume of the file system, then this fragmentation of the data storage of the file causes the performance of file access to suffer from an inability to obtain locality of access to the data storage. Locality of access is desired because it increases the likelihood that address translation caches and data caches in the digital computer will contain the addresses and data for access to the file. Locality of access also improves the fetching and streaming of data from the data storage.

A known method of dealing with file fragmentation is to run a background defragmentation process in order to restore read performance upon large files. The background defragmentation process, however, contends with user I/O for locks and file mapping metadata, so that the defragmentation process should be designed and operated with care so as to be transparent to application programs. See, for example, the storage reorganizer described in Bono et al., U.S. Pat. No. 7,631,155 issued Dec. 8, 2009, entitled Thin Provisioning of a File System and an ISCSI LUN Through a Common Mechanism.

SUMMARY OF THE INVENTION

In accordance with one aspect, the invention provides a method of reducing fragmentation of a file when writing to the file in a digital computer. The method includes a data processor of the digital computer executing computer instructions stored in a non-transitory computer readable storage medium to respond to a request to write data to a specified number of blocks in a logical extent of the file beginning at a specified offset in the logical extent of the file by determining whether or not file system block allocations exist for the specified number of blocks in the logical extent of the file beginning at the specified offset in the logical extent of the file. Upon determining that file system block allocations exist for the specified number of blocks in the logical extent of the file beginning at the specified offset in the logical extent of the file, it is determined that that the file is fragmented over the file system block allocations for the specified number of blocks in the logical extent of the file beginning at the specified offset in the logical extent of the file. In response to determining that the file is fragmented over the file system block allocations for the specified number of blocks of the file beginning at the specified offset in the logical extent of the file, the method further includes allocating a single extent of a number of contiguous file system blocks equal to the specified number, writing the specified number of blocks of data to the specified number of the contiguous file system blocks in the newly allocated single extent, and substituting the specified number of the contiguous file system blocks in the newly allocated single extent for the file system block allocations for the specified number of blocks in the logical extent of the file beginning at the specified offset in the logical extent of the file, in order to reduce the fragmentation of the file.

In accordance with another aspect, the invention provides a file server. The file server includes a data processor and non-transitory computer readable storage medium. The non-transitory computer readable storage medium stores computer instructions that, when executed by the data processor, perform the steps of: (a) responding to a request to write data to a specified number of blocks in a logical extent of a file beginning at a specified offset in the logical extent of the file by determining whether or not file system block allocations exist for the specified number of blocks in the logical extent of the file beginning at the specified offset in the logical extent of the file; and (b) upon determining in step (a) that file system block allocations exist for the specified number of blocks in the logical extent of the file beginning at the specified offset in the logical extent of the file, determining that the file is fragmented over the file system block allocations for the specified number of blocks in the logical extent of the file beginning at the specified offset in the logical extent of the file; and (c) in response to determining in step (b) that the file is fragmented over the file system block allocations for the specified number of blocks of the file beginning at the specified offset in the logical extent of the file, allocating a single extent of a number of contiguous file system blocks equal to the specified number, writing the specified number of blocks of data to the specified number of the contiguous file system blocks in the newly allocated single extent, and substituting the specified number of the contiguous file system blocks in the newly allocated single extent for the file system block allocations for the specified number of blocks in the logical extent of the file beginning at the specified offset in the logical extent of the file, in order to reduce the fragmentation of the file.

In accordance with a final aspect, the invention provides non-transitory computer readable storage medium storing computer instructions that, when executed by a data processor, perform the steps of: (a) responding to a request to write data to a specified number of blocks in a logical extent of a file beginning at a specified offset in the logical extent of the file by determining whether or not file system block allocations exist for the specified number of blocks in the logical extent of the file beginning at the specified offset in the logical extent of the file; and (b) upon determining in step (a) that file system block allocations exist for the specified number of blocks in the logical extent of the file beginning at the specified offset in the logical extent of the file, determining that the file is fragmented over the file system block allocations for the specified number of blocks in the logical extent of the file beginning at the specified offset in the logical extent of the file; and (c) in response to determining in step (b) that the file is fragmented over the file system block allocations for the specified number of blocks of the file beginning at the specified offset in the logical extent of the file, allocating a single extent of a number of contiguous file system blocks equal to the specified number, writing the specified number of blocks of data to the specified number of the contiguous file system blocks in the newly allocated single extent, and substituting the specified number of the contiguous file system blocks in the newly allocated single extent for the file system block allocations for the specified number of blocks in the logical extent of the file beginning at the specified offset in the logical extent of the file, in order to reduce the fragmentation of the file.

BRIEF DESCRIPTION OF THE DRAWINGS

Additional features and advantages of the invention will be described below with reference to the drawings, in which.

Figure 1:
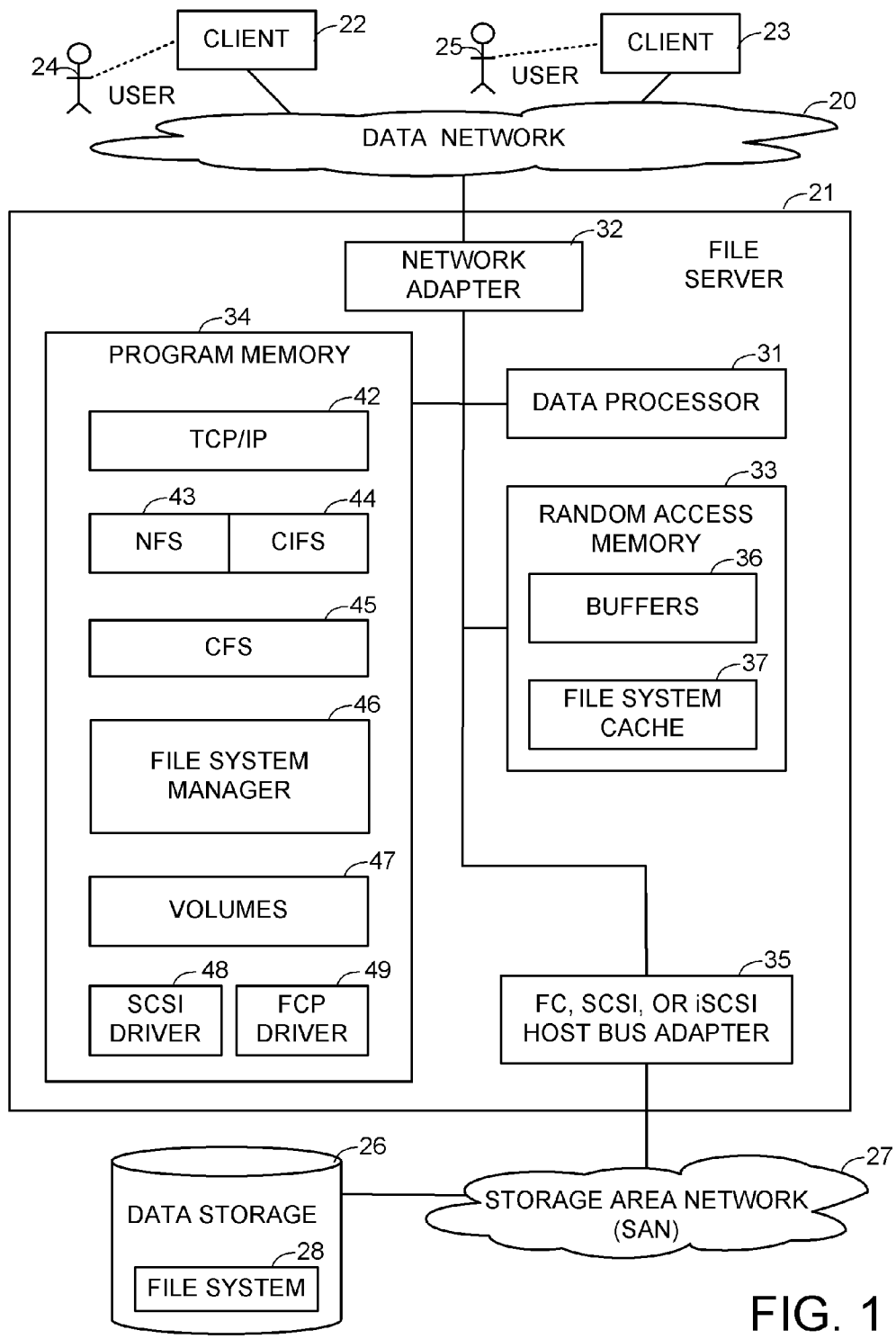
FIG. 1 is block diagram of a data network including a file server.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data network 20 including a file server 21 for servicing file access requests from network clients 22, 23. The network clients 22, 23, for example, are workstations operated by respective human users 24, 25. The file server permits the clients 22, 23 to access files in a file system 28 stored in data storage 26 linked to file server 21 via a storage area network (SAN) 27. The data storage 26, for example, is an array of disk drives.

The file server 21 includes a data processor 31, a network adapter 32 linking the data processor to the data network 20, random access memory 33, program memory 34, and a Fibre-Channel (FC), Small Computer Systems Interface (SCSI), or Internet Protocol SCSI (iSCSI) host bus adapter 35 linking the data processor to the storage area network (SAN) 27. The data processor 31 is a general purpose digital computer data processor including one or more core central processing units (CPUs) for executing computer program instructions stored in the program memory 34. The program memory 34 is a non-transitory computer readable storage medium, such as electrically erasable and programmable read-only memory (EEPROM). The random access memory 33 includes buffers 36 and a file system cache 37.

The program memory 34 includes a program layer 42 for network communication using the Transmission Control Protocol (TCP) and the Internet Protocol (IP). The program memory also includes a Network File System (NFS) module 43 for supporting file access requests using the NFS file access protocol, and a Common Internet File System (CIFS) module 44 for supporting file access requests using the CIFS file access protocol.

The NFS module 43 and the CIFS module 44 are layered over a Common File System (CFS) module 45. The CFS module 45 is layered over a file system manager module 46. The file system manager module 46 supports a UNIX-based file system, and the CFS module 45 provides higher-level functions common to NFS and CIFS. For example, the file system manager module 46 maintains the file system 28 in the data storage 26, and maintains the file system cache 37 in the random access memory 33.

The program memory 34 further includes a logical volumes layer 47 providing a logical volume upon which the file system 28 is built. The logical volume is configured from the data storage. For example, the logical volume is configured from one or more logical unit numbers (LUNs) of the data storage 26. The logical volumes layer 47 is layered over a SCSI driver 48 and a Fibre-Channel protocol (FCP) driver 49 in order to access the logical unit numbers (LUNs) in the storage area network (SAN) 27. The data processor 31 sends storage access requests through the host bus adapter 35 using the SCSI protocol, the iSCSI protocol, or the Fibre-Channel protocol, depending on the particular protocol used by the storage area network (SAN) 27.

Figure 2:
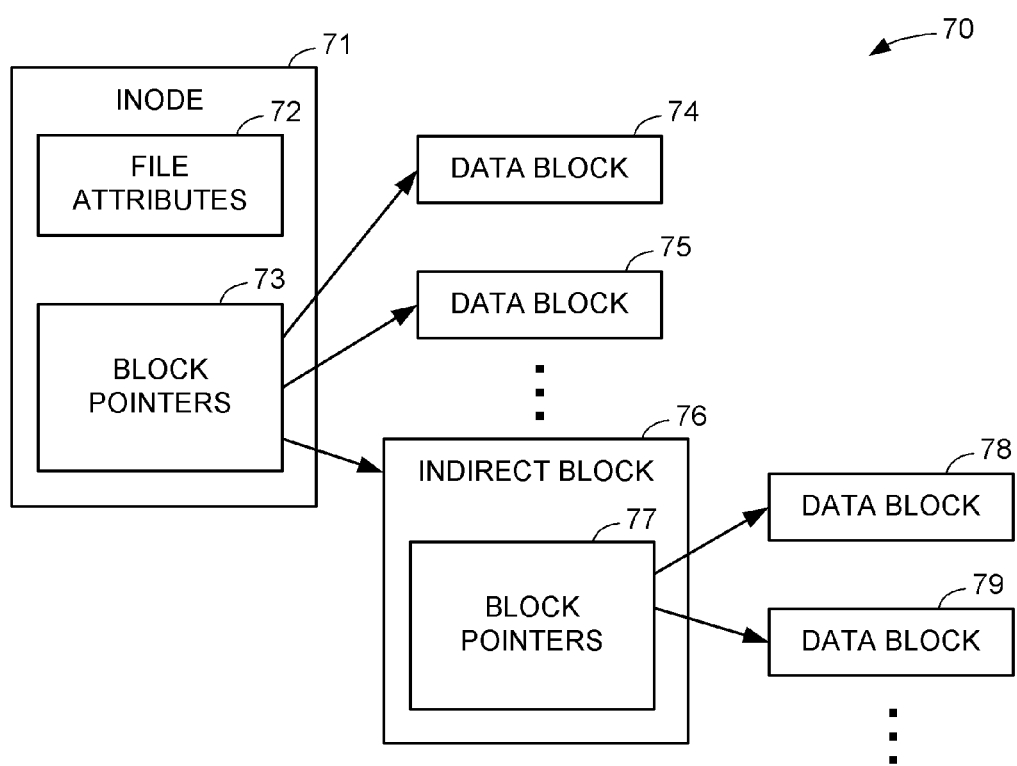
FIG. 2 is a block diagram of a file.

FIG. 2 shows a file 70 in a UNIX-based file system. The UNIX-based file system is described in Uresh Vahalia, Unix Internals—The New Frontiers, Chapter 9, File System Implementations, pp. 261-290, Prentice-Hall, Inc., Upper Saddle River, N.J. (1996). The file 70 in the UNIX-based file system is a hierarchy of file system blocks. The file system block 71 at the top or root of the hierarchy is called an "inode." The inode contains attributes 72 of the file 70, such as the file type, the size of the file, user and group IDs of the owner of the file, timestamps, and permissions and mode flags. The inode 71 also contains a block pointer array 73 including pointers to one or more file system blocks 74, 75, 76 that are directly below the inode in the hierarchy. The data of the file is contained in one or more file system data blocks 74, 75, 76, 79 at the bottom or leaves of the hierarchy.

If the file 70 contains more than ten data blocks, then there will be at least one indirect block 76 directly below inode 71 in the hierarchy. Each indirect block 71 includes a block pointer array 77 of up to 256 block pointers. In a very large file, there can be up to three indirect blocks along the path from the inode down to a data block of the file.

The fact that the file 70 contains pointers to the data blocks in the file permits any free block of the file system to be allocated to a file of the file system and mapped to any logical block of the logical extent of the file. The additional flexibility of file system block allocation permits more efficient storage utilization by reducing storage fragmentation and permitting sparse files and efficient dynamic extension of files.

Figure 3:
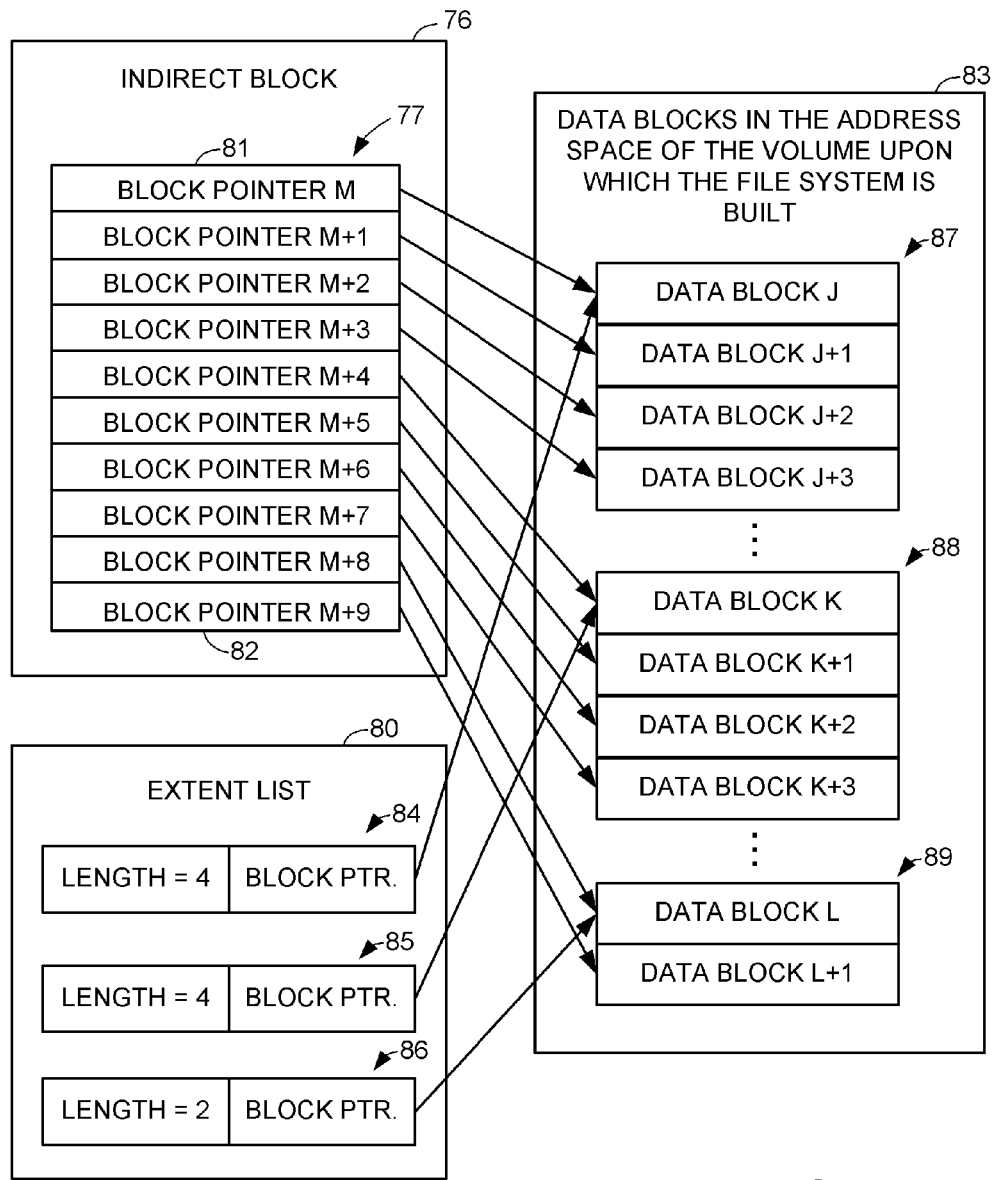
FIG. 3 is a block diagram showing fragmentation of a portion of the file introduced in FIG. 2.

FIG. 3 illustrates fragmentation of the file of FIG. 2 over a portion of the logical extent of the file (70 of FIG. 2) in the file system (28 of FIG. 1). The portion of the logical extent of the file is the portion mapped by ten consecutive block pointers in the block pointer array 77 of the indirect block 76. The ten consecutive block pointers begin with a block pointer 81 and end with a block pointer 82. If this portion of the logical extent of the file were not fragmented, then these ten block pointers would point to ten file system data blocks that would be contiguous in the address space 83 of the volume upon which the file system is built.

As shown in FIG. 3, the portion of the logical extent of the file mapped by the ten block pointers in the block pointer array 77 is fragmented into three separate extents 87, 88, 89 of contiguous file system data blocks in the address space 83. The first extent 87 includes four contiguous file system data blocks. The second extent 99 also includes four contiguous file system data blocks. The third extent 89 includes two contiguous file system data blocks.

If the logical extent of a file becomes mapped to a large number of relatively small extents that are widely distributed over the logical volume of the file system, then this fragmentation of the data storage of the file causes the performance of file access to suffer from an inability to obtain locality of access to the data storage. Locality of access is desired because it increases the likelihood that address translation caches and data caches in the digital computer will contain the addresses and data for access to the file. Locality of access also improves the fetching and streaming of data from the data storage.

A known method of dealing with file fragmentation is to run a background defragmentation process in order to restore read performance upon large files. The background defragmentation process, however, contends with user I/O for locks and file mapping metadata, so that the defragmentation process should be designed and operated with care so as to be transparent to application programs.

In accordance with the present invention, file defragmentation is performed during file over-write. When a file system manager responds to a request to write data to a specified number of blocks of a file, the file system manager determines whether or not corresponding file system data block allocations exist and whether the file is fragmented over the corresponding file system data block allocations. In response to determining that the file is fragmented over corresponding file system data block allocations, the file system manager allocates and substitutes a single extent of contiguous file system data blocks for the corresponding file system data block allocations, and writes data to the contiguous file system data blocks in the newly allocated single extent. This approach has the advantage of performing a good amount of defragmentation for the file without introducing new contention with user read or write operations.

Suppose, for example, that the file system manager receives a user request to write ten blocks of data to the file beginning at an offset corresponding to the first block pointer 81 in FIG. 3. The file system manager determines, from the presence of the ten block pointers in the block pointer array 77, that data block allocations exist for this portion of the logical extent of the file. The file system manager also determines, by inspecting the block pointers in the block pointer array and finding that some of the block pointers are not consecutive, that this portion of the file is fragmented into the three separate extents 87, 88, and 89. The file system manager also finds that a single extent of ten free file system blocks can be allocated and substituted in the file for the three separate extents 87, 88, and 89, so that this portion of the logical extent of the file can and should be de-fragmented during the file over-write.

Figure 4:
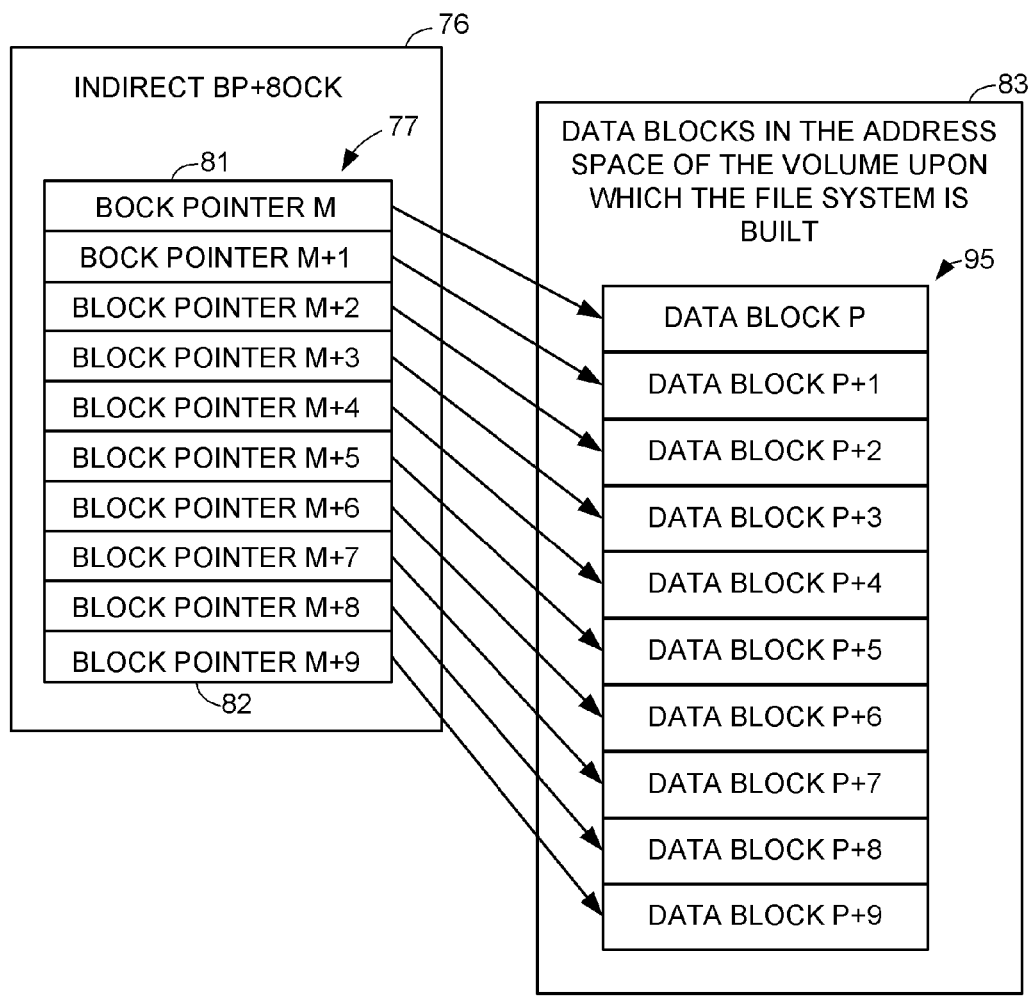
FIG. 4 is a block diagram showing defragmentation of the portion of the file shown in FIG. 3.

As shown in FIG. 4, the file system manager has found and allocated a single extent 95 of ten free contiguous file system blocks in the address space of the logical volume upon which the file system is built. The file system manager has substituted the single extent 95 for the three separate extents (87, 88, and 89 in FIG. 3) that were originally found to have been allocated to the portion of the logical extent of the file including the ten blocks beginning at the offset corresponding to the first block pointer 81. The file system manager substituted the single extent 95 of contiguous file system blocks for the three separate extents (87, 88, and 89 in FIG. 3) by changing the block pointers (M, M+1, M+2, M+9) to point to the ten contiguous file system blocks (P, P+1, P+2, P+9) in the newly allocated single extent 95 of contiguous file system blocks.

As there are more and more over-writes to different portions of the logical extent of the file, the file will start offering better read performance and subsequent over-write performance. Another advantage is that defragmentation is done in tune with the user's write patterns. Thus, effort is directed towards finding better contiguous file system data block allocations for the portions of the logical extent of the file that the user is frequently accessing during single write requests. The additional overhead for the write operation is relatively small, because it may entail simply detecting the fragmentation of the portion of the logical extent of the file being overwritten, allocating the single extent of free contiguous file system data blocks, and then changing the inode or indirect block pointers to point to the newly allocated single extent of contiguous file system data blocks, and releasing the old file system data block allocations asynchronously.

The detection of fragmentation is not burdensome in a majority of cases, and fragmentation need not be detected and corrected for the minority of cases for which the fragmentation is relatively insignificant or relatively difficult to detect and correct during file over-write. Allocation of the single extent of free contiguous file system data blocks can be made an insignificant part of the overhead by maintaining a cached in-memory map of free file system blocks. Consequently, the additional overhead for the write operation is minor compared to the more burdensome operation of writing the data to the allocated blocks. The more burdensome operation of writing the data to the allocated blocks is no more burdensome when writing to the newly allocated single extent of contiguous file system data blocks than when writing to the previously allocated fragmented extents of the file system data blocks.

Figure 5:
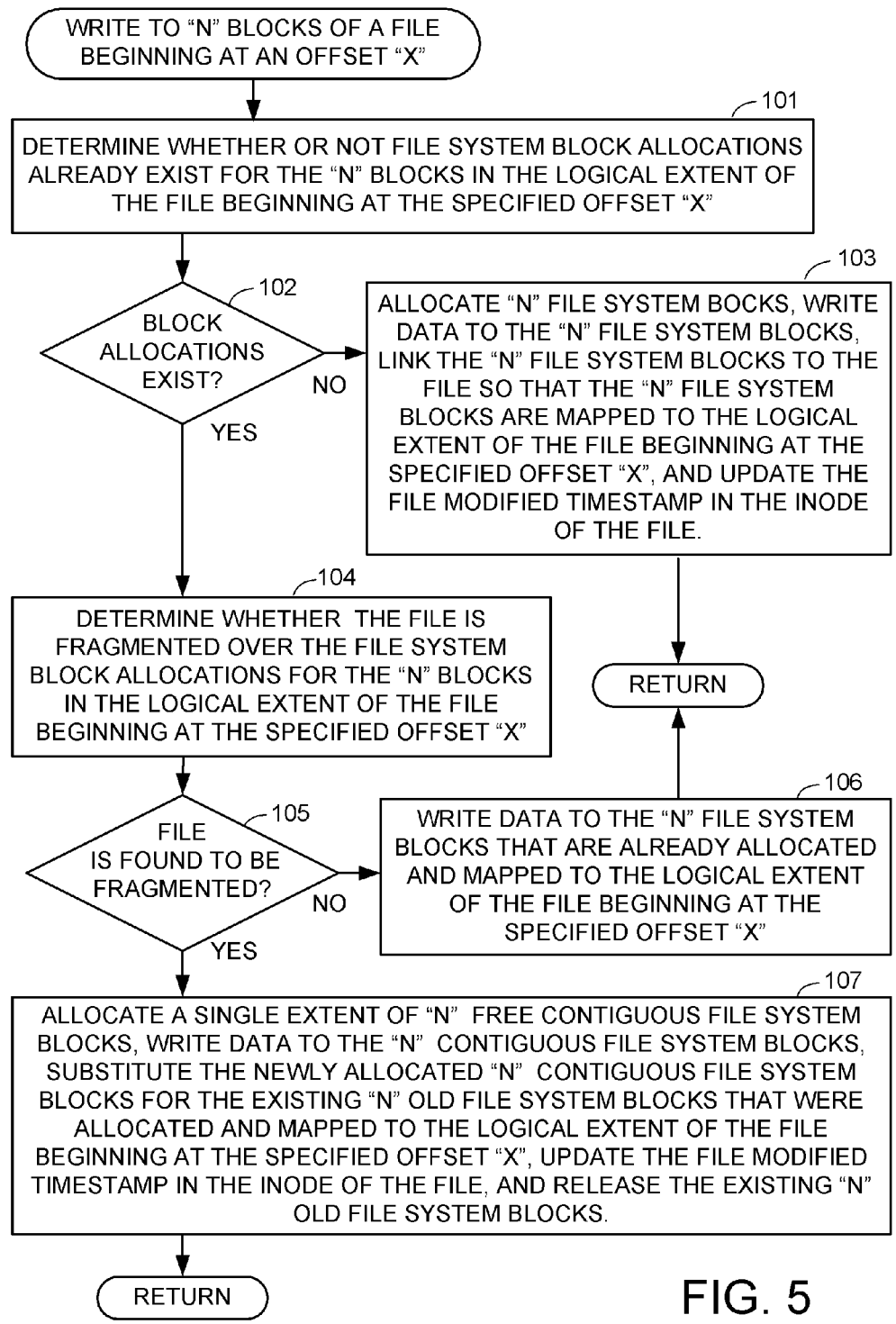
FIG. 5 is a flowchart of a procedure for file defragmentation during over-write upon the file.

FIG. 5 shows the basic procedure for file defragmentation during an over-write upon the file. The file system manager (46 in FIG. 1) includes a program routine that performs this procedure upon receiving a client request to write data to a specified number "N" of blocks of data to a specified file beginning at a specified block offset "X" in the logical extent of the file. The file, for example, is specified by an NFS file handle, or by a CIFS file ID.

In a first step 101 of FIG. 5, the file system manager determines whether or not file system block allocations already exist for the "N" blocks in the logical extent of the file beginning at the specified offset "X". In general, this is a conventional step for a file system manager, and the file system manager performs this step by accessing file mapping metadata for the file, such as the block pointers in the inode or in one or more indirect blocks for the file. In step 102, if the block allocations do not exist, then execution branches to step 103. In step 103, the file system manager allocates "N" file system blocks, writes data to the "N" file system blocks, links the "N" file system blocks to the file so that the "N" file system blocks are mapped to the logical extent of the file beginning at the specified offset "X", and updates the file modified timestamp in the attributes (72 in FIG. 2) of the inode (71 in FIG. 2) of the file. After step 103, the processing of the write request has been finished, so that execution returns.

In step 102, if the block allocations exist, then execution continues to step 104. In this case, the write request is requesting an over-write upon the existing allocated blocks of the file. In step 104, the file system manager determines whether the file is fragmented over the file system block allocations found to exist in step 102. In step 105, if the file is not found to be fragmented over these file system block allocations, then execution branches to step 106. In step 106, the file system manager writes data to these "N" file system blocks that were found to exist in step 102. After step 106, the processing of the write request has been finished, so that execution returns.

In step 105, if the file is found to be fragmented over the file system block allocations found to exist in step 102, then execution continues to step 107. In step 107, the file system manager allocates a single extent of "N" free contiguous file system blocks, writes data to the newly allocated "N" contiguous file system blocks, substitutes the newly allocated "N" contiguous file system blocks for the existing "N" old file system blocks that were found in step 102 to be allocated and mapped to the logical extent of the file beginning at the specified offset "X", updates the file modified timestamp in the inode of the file, and releases the existing "N" old file system blocks. After step 107, processing of the write request is finished, and execution returns.

Figure 6:
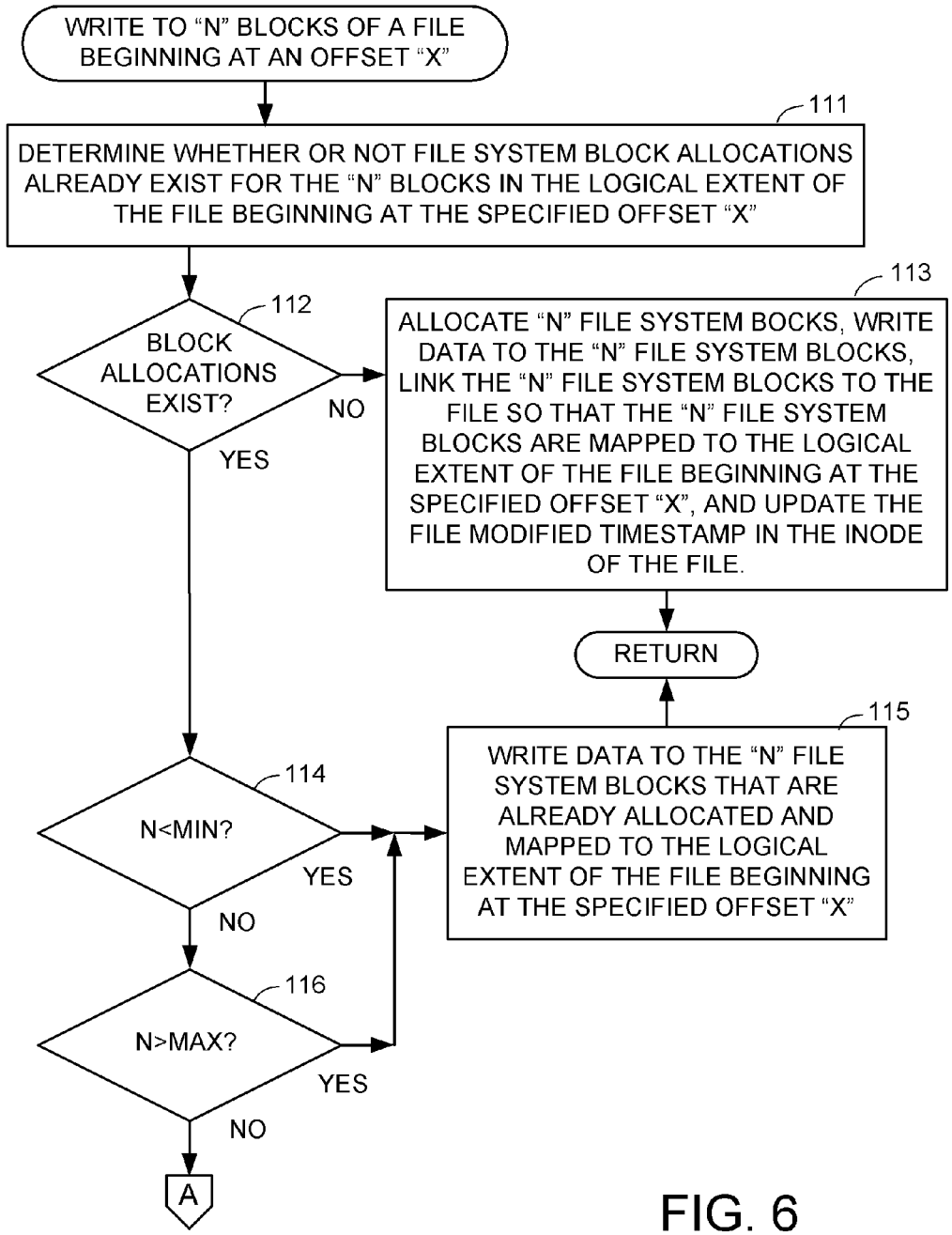
FIGS. 6 and 7 together show a more detailed flowchart of a procedure for file defragmentation during over-write upon the file.
Figure 7:
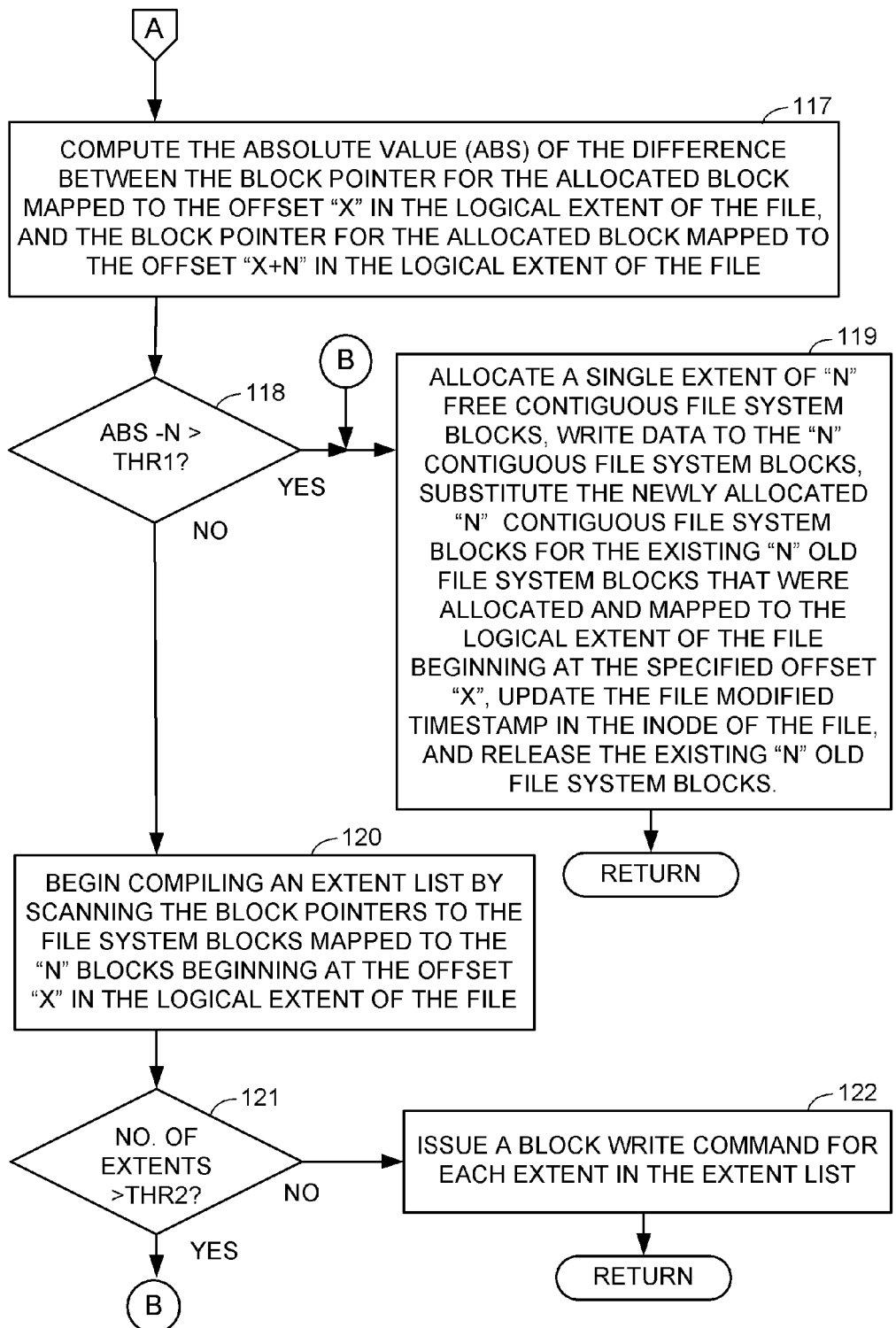

FIGS. 6 and 7 show a more detailed flowchart of the procedure for file defragmentation during over-write of the file. Steps 111, 112, and 113 correspond to steps 101, 102, and 103 of FIG. 5. If step 112 finds that block allocations already exist for the "N" blocks in the logical extent of the file beginning at the specified offset "X", then execution continues from step 112 to step 114. In step 114, the file system manager compares the specified number of blocks "N" to a certain minimum value (MIN). For example, MIN has a value of three. If "N" is less than "MIN", then execution branches to step 115, to write data to the "N" file system blocks that were found in step 112 to be already allocated and mapped to the logical extent of the file beginning at the specified offset "X", and then execution returns. Step 114 recognizes that there is not much to be gained by attempting to defragment a portion of a logical extent having just one or two blocks. In step 114, if "N" is not less than "MIN", then execution continues to step 116.

In step 116, the file system manager compares the specified number "N" to a certain maximum value "MAX". If the specified number "N" is greater than "MAX", then execution branches to step 115. Step 116 recognizes that allocation of a single extent of "N" free contiguous blocks may be difficult if "N" is greater than "MAX" so there is not much to be gained by attempting to defragment a portion of a logical extent having a very large number of blocks by writing to a newly allocated single extent of "N" contiguous blocks. The value of "MAX" could be adjusted from time-to-time depending on the availability of large extents of free contiguous blocks, so that "MAX" would be decreased when the file system becomes relatively large and the number of free blocks becomes relatively small. If "N" is not greater than "MAX", then execution continues from step 116 to step 117 of FIG. 7.

In step 117 of FIG. 7, the file system manager computes a "spread" of the "N" file system data blocks in the address space of the logical volume mapped to the portion of the logical extent of the file. The "spread" is computed as the absolute value (ABS) of the difference between the block pointer for the allocated block mapped to the offset "X" in the logical extent of the file, and the block pointer of the allocated block mapped to the offset "X+N" in the logical extent of the file. For example, the block pointers are block numbers that are consecutive for file system blocks that are contiguous in the address space of the logical volume upon which the file system is built. Thus, an extent of "N" contiguous blocks has a spread of "N".

After step 117, execution continues to step 118, which compares "ABS-N" to a threshold (THR1), to determine whether the "ABS" indicates fragmentation over the portion of the logical extent of the file between the offset "X" and X+N." The threshold (THR1) can be set so that defragmentation is performed when the spread indicates a significant degree of non-locality. For example, the threshold (THR1) is 256. The threshold (THR1) could be a function of "N" so that the threshold (THR1) increases to some degree as N increases; for example, THR1=256+N/2. The threshold THR1 could also be adjusted from time-to-time based on a number of free file system blocks in the file system including the file. For example, the threshold is increased as the number of allocated blocks in the file system increases and the number of free file system blocks in the file system decreases, in order to respond to the increased difficulty in finding large, single extents of free contiguous file system blocks when the free file system blocks in the file system becomes relatively scarce.

In step 118, if "ABS-N" is greater than the threshold (THR1), then fragmentation of the file has been found, and execution branches to step 119. In step 119, the file is defragmented by allocating a single extent of "N" free contiguous file system blocks, writing data to the newly allocated "N" contiguous file system blocks, substituting the newly allocated "N" contiguous file system blocks for the existing "N" old file system blocks that were found in step 112 of FIG. 6 to be allocated and mapped to the logical extent of the file beginning at the specified offset "X", updating the file modified timestamp in the inode of the file, and releasing the existing "N" old file system blocks. After step 119, processing of the write request is finished, and execution returns.

If step 118 finds that "ABS-N" is not greater than the threshold (THR1), execution continues from step 118 to step 120. In step 120, the file system manager begins to compile an extent list by scanning the block pointers to the file system blocks mapped to the "N" blocks beginning at the offset "X" in the logical extent of the file.

An example of an extent list is the extent list 80 in FIG. 3. The extent list 80 includes a respective extent list entry 84, 85, 86 for each separate extent over the portion of the logical extent of the file beginning at the specified offset "X" (corresponding to the first block pointer 81) and including the specified number of blocks "N". Each extent list entry includes a length and a block pointer to a respective extent of file system blocks that are contiguous in the address space 83 of the volume upon which the file system is built. The extent list is compiled by scanning the block pointer array 77 to search for block pointer values that are consecutive. When a block pointer is found that is consecutive with the immediately preceding block pointer in the array, the length in the current extent entry is incremented by one. When a block pointer is found that is not consecutive with the immediately preceding block pointer in the array, a new extent list entry is added to the extent list.

Returning now to FIG. 6, during the compilation of the extent list in step 120, if the number of separate extents found exceeds a certain threshold (THR2), such as two, then in step 121 the compilation of the extent list is terminated because fragmentation has been found so that execution continues to step 119 to perform defragmentation during over-write by allocating and writing to a single extent of "N" contiguous file system blocks. The threshold "THR2" could be adjusted from time-to-time based on the number of free file system blocks in the file system including the file. For example, the threshold is increased as the number of allocated blocks in the file system increases and the number of free file system blocks in the file system decreases, in order to respond to the increased difficulty in finding large, single extents of free contiguous file system blocks when the free file system blocks in the file system becomes relatively scarce.

In step 121, if the number of separate extents does not exceed the threshold (THR2), then execution branches to step 122 to issue a block write command for each extent in the extent list. After step 122, processing of the write request is finished, and execution returns.

In view of the above, there has been described a method, apparatus, and non-transitory computer-readable storage medium for file defragmentation during file over-writes. When a file system manager responds to a request to write data to a specified number of blocks of a file, the file system manager determines that corresponding file system data block allocations exist and determines that the file is fragmented over the corresponding file system data block allocations. In response to determining that the file is fragmented over the corresponding file system data block allocations, the file system manager allocates a single extent of the specified number of contiguous file system data blocks, writes data to the newly allocated contiguous file system data blocks, and substitutes the newly allocated contiguous file system data blocks for the old file system block allocations in the file. For example, the file system manager compares a spread and count of extent fragments of the file system data block allocations to appropriate thresholds to trigger the defragmentation upon file over-write. This approach has the advantage of performing a good amount of defragmentation for the file without introducing new contention with user read or write operations. As there are more and more over-writes to different portions of the logical extent of the file, the file will start offering better read performance and subsequent over-write performance. In addition, the defragmentation is done in tune with the user's write patterns. Thus, effort is directed towards finding better contiguous file system data block allocations for the portions of the logical extent of the file that the user is frequently accessing during single write requests.

What is claimed is:

1. A method of reducing fragmentation of a file when writing to the file in a digital computer, said method comprising a data processor of the digital computer executing computer instructions stored in a non-transitory computer readable storage medium to perform the steps of:

(a) responding to a request to write data to a specified number of blocks in a logical extent of the file beginning at a specified offset in the logical extent of the file by determining whether or not file system block allocations exist for the specified number of blocks in the logical extent of the file beginning at the specified offset in the logical extent of the file; and (b) upon determining in step (a) that file system block allocations exist for the specified number of blocks in the logical extent of the file beginning at the specified offset in the logical extent of the file, obtaining a measure of the fragmentation of the file over the file system block allocations for the specified number of blocks of the file beginning at the specified offset in the logical extent of the file, and based on the measure of fragmentation of the file over the file system block allocations for the specified number of blocks of the file beginning at the specified offset in the logical extent of the file, determining that the file is fragmented over the file system block allocations for the specified number of blocks in the logical extent of the file beginning at the specified offset in the logical extent of the file; and (c) in response to determining in step (b) that the file is fragmented over the file system block allocations for the specified number of blocks of the file beginning at the specified offset in the logical extent of the file, allocating a single extent of a number of contiguous file system blocks equal to the specified number, writing the specified number of blocks of data to the specified number of the contiguous file system blocks in the newly allocated single extent, and substituting the specified number of the contiguous file system blocks in the newly allocated single extent for the file system block allocations for the specified number of blocks in the logical extent of the file beginning at the specified offset in the logical extent of the file, in order to reduce the fragmentation of the file.

2. The method as claimed in claim 1, wherein step (b) further includes comparing the measure of fragmentation to a threshold in order to determine that the file is fragmented over the file system block allocations for the specified number of blocks in the logical extent of the file beginning at the specified offset in the logical extent of the file.

3. The method as claimed in claim 2, wherein step (b) further includes obtaining the measure of fragmentation by computing a difference between addresses of the file system block allocations for the specified number of blocks in the logical extent of the file beginning at the specified offset in the logical extent of the file.

4. The method as claimed in claim 3, wherein step (b) further includes computing a difference between a block pointer to a first file system block allocation for the specified offset in the logical extent of the file, and a block pointer to a last file system block allocation for a last of the specified number of blocks following the specified offset in the logical extent of the file, in order to compute the difference between addresses of the file system block allocations for the specified number of blocks in the logical extent of the file beginning at the specified offset in the logical extent of the file.

5. The method as claimed in claim 2, wherein step (b) further includes obtaining the measure of fragmentation by counting separate extents of contiguous file system blocks in the file system block allocations for the specified number of blocks in the logical extent of the file beginning at the specified offset in the logical extent of the file.

6. The method as claimed in claim 5, wherein step (b) further includes scanning block pointers to the file system block allocations for the specified number of blocks in the logical extent of the file beginning at the specified offset in the logical extent of the file, in order to count the separate extents of contiguous file system blocks in the file system block allocations for the specified number of blocks in the logical extent of the file beginning at the specified offset in the logical extent of the file.

7. The method as claimed in claim 2, which further includes adjusting the threshold based on a number of free file system blocks in a file system including the file.

8. A file server comprising a data processor and non-transitory computer readable storage medium storing computer instructions that, when executed by the data processor, perform the steps of:
   (a) responding to a request to write data to a specified number of blocks in a logical extent of a file beginning at a specified offset in the logical extent of the file by determining whether or not file system block allocations exist for the specified number of blocks in the logical extent of the file beginning at the specified offset in the logical extent of the file; and
   (b) upon determining in step (a) that file system block allocations exist for the specified number of blocks in the logical extent of the file beginning at the specified offset in the logical extent of the file, obtaining a measure of fragmentation of the file over the file system block allocations for the specified number of blocks of the file beginning at the specified offset in the logical extent of the file, and based on the measure of fragmentation of the file over the file system block allocations for the specified number of blocks of the file beginning at the specified offset in the logical extent of the file, determining that the file is fragmented over the file system block allocations for the specified number of blocks in the logical extent of the file beginning at the specified offset in the logical extent of the file; and
   (c) in response to determining in step (b) that the file is fragmented over the file system block allocations for the specified number of blocks of the file beginning at the specified offset in the logical extent of the file, allocating a single extent of a number of contiguous file system blocks equal to the specified number, writing the specified number of blocks of data to the specified number of the contiguous file system blocks in the newly allocated single extent, and substituting the specified number of the contiguous file system blocks in the newly allocated single extent for the file system block allocations for the specified number of blocks in the logical extent of the file beginning at the specified offset in the logical extent of the file, in order to reduce the fragmentation of the file.

9. The file server as claimed in claim 8, wherein step (b) further includes comparing the measure of fragmentation to a threshold in order to determine that the file is fragmented over the file system block allocations for the specified number of blocks in the logical extent of the file beginning at the specified offset in the logical extent of the file.

10. The file server as claimed in claim 9, wherein step (b) further includes obtaining the measure of fragmentation by computing a difference between addresses of the file system block allocations for the specified number of blocks in the logical extent of the file beginning at the specified offset in the logical extent of the file.

11. The file server as claimed in claim 10, wherein step (b) further includes computing a difference between a block pointer to a first file system block allocation for the specified offset in the logical extent of the file, and a block pointer to a last file system block allocation for a last of the specified number of blocks following the specified offset in the logical extent of the file, in order to compute the difference between addresses of the file system block allocations for the specified number of blocks in the logical extent of the file beginning at the specified offset in the logical extent of the file.

12. The file server as claimed in claim 9, wherein step (b) further includes obtaining the measure of fragmentation by counting separate extents of contiguous file system blocks in the file system block allocations for the specified number of blocks in the logical extent of the file beginning at the specified offset in the logical extent of the file.

13. The file server as claimed in claim 12, wherein step (b) further includes scanning block pointers to the file system block allocations for the specified number of blocks in the logical extent of the file beginning at the specified offset in the logical extent of the file, in order to count the separate extents of contiguous file system blocks in the file system block allocations for the specified number of blocks in the logical extent of the file beginning at the specified offset in the logical extent of the file.

14. The file server as claimed in claim 12, wherein the computer instructions, when executed by the data processor, further perform adjusting of the threshold based on a number of free file system blocks in a file system including the file.

15. A non-transitory computer readable storage medium storing computer instructions that, when executed by a data processor, perform the steps of:
   (a) responding to a request to write data to a specified number of blocks in a logical extent of a file beginning at a specified offset in the logical extent of the file by determining whether or not file system block allocations exist for the specified number of blocks in the logical extent of the file beginning at the specified offset in the logical extent of the file; and
   (b) upon determining in step (a) that file system block allocations exist for the specified number of blocks in the logical extent of the file beginning at the specified offset in the logical extent of the file, obtaining a measure of fragmentation of the file over the file system block allocations for the specified number of blocks of the file beginning at the specified offset in the logical extent of the file, and based on the measure of fragmentation of the file over the file system block allocations for the specified number of blocks of the file beginning at the specified offset in the logical extent of the file, determining that the file is fragmented over the file system block allocations for the specified number of blocks in the logical extent of the file beginning at the specified offset in the logical extent of the file; and
   (c) in response to determining in step (b) that the file is fragmented over the file system block allocations for the specified number of blocks of the file beginning at the specified offset in the logical extent of the file, allocating a single extent of a number of contiguous file system blocks equal to the specified number, writing the specified number of blocks of data to the specified number of the contiguous file system blocks in the newly allocated single extent, and substituting the specified number of the contiguous file system blocks in the newly allocated single extent for the file system block allocations for the specified number of blocks in the logical extent of the file beginning at the specified offset in the logical extent of the file, in order to reduce the fragmentation of the file.

16. The non-transitory computer readable storage medium as claimed in claim 15, wherein step (b) further includes comparing the measure of fragmentation to a threshold in order to determine that the file is fragmented over the file system block allocations for the specified number of blocks in the logical extent of the file beginning at the specified offset in the logical extent of the file.

17. The non-transitory computer readable storage medium as claimed in claim 16, wherein step (b) further includes obtaining the measure of fragmentation by computing a difference between addresses of the file system block allocations for the specified number of blocks in the logical extent of the file beginning at the specified offset in the logical extent of the file.

18. The non-transitory computer readable storage medium as claimed in claim 17, wherein step (b) further includes computing a difference between a block pointer to a first file system block allocation for the specified offset in the logical extent of the file, and a block pointer to a last file system block allocation for a last of the specified number of blocks following the specified offset in the logical extent of the file, in order to compute the difference between addresses of the file system block allocations for the specified number of blocks in the logical extent of the file beginning at the specified offset in the logical extent of the file.

19. The non-transitory computer readable storage medium as claimed in claim 16, wherein step (b) further includes obtaining the measure of fragmentation by counting separate extents of contiguous file system blocks in the file system block allocations for the specified number of blocks in the logical extent of the file beginning at the specified offset in the logical extent of the file.

20. The non-transitory computer readable storage medium as claimed in claim 19, wherein step (b) further includes scanning block pointers to the file system block allocations for the specified number of blocks in the logical extent of the file beginning at the specified offset in the logical extent of the file, in order to count the separate extents of contiguous file system blocks in the file system block allocations for the specified number of blocks in the logical extent of the file beginning at the specified offset in the logical extent of the file.

* * * * *